United States Patent [19]

Morita et al.

[11] Patent Number: 4,679,453
[45] Date of Patent: Jul. 14, 1987

[54] APPARATUS FOR PRODUCING STEPWISE MOVEMENT

[75] Inventors: Masayuki Morita; Masaichi Hattori, both of Aichi, Japan

[73] Assignee: Kabushiki Kaisha Tokai Rika Denki Seisakusho, Aichi, Japan

[21] Appl. No.: 615,823

[22] Filed: May 31, 1984

[30] Foreign Application Priority Data

Jun. 1, 1983 [JP] Japan ................. 58-98203

[51] Int. Cl.⁴ .................. F16H 27/02; F16H 31/00
[52] U.S. Cl. ..................... 74/128; 74/141.5; 74/156; 74/160; 74/169
[58] Field of Search ........... 74/111, 126, 128, 141.5, 74/156, 160, 169

[56] References Cited

U.S. PATENT DOCUMENTS

| 315,883 | 4/1885 | Arnold | 74/160 |
|---|---|---|---|
| 1,126,084 | 1/1915 | Reisbach | 74/128 |
| 1,446,267 | 2/1923 | Newcomb | 74/142 |
| 1,659,876 | 2/1928 | Jarvis | 74/141.5 |
| 2,732,101 | 1/1956 | Sohn | 74/169 |
| 3,435,167 | 3/1969 | Peleger | 200/156 |

FOREIGN PATENT DOCUMENTS

| 227357 | 6/1959 | Australia | 200/156 |
|---|---|---|---|
| 1182193 | 9/1956 | France | 74/141.5 |
| 44-14074 | 6/1969 | Japan | 74/141.5 |
| 229145 | 11/1969 | U.S.S.R. | 74/143 |

Primary Examiner—Lawrence J. Staab
Attorney, Agent, or Firm—Finnegan, Henderson, Farabow, Garrett and Dunner

[57] ABSTRACT

An apparatus for providing stepwise movement along an elongated stepped member. A holder contains at least one button that includes a pivotally mounted claw disposed to engage the stepped member when the button is depressed. The claw pivots upon engagement with the stepped member and further depression of the button moves the button and holder laterally a distance determined by the steps on the stepped member.

10 Claims, 24 Drawing Figures

APPARATUS FOR PRODUCING STEPWISE MOVEMENT

BACKGROUND OF THE INVENTION

1. Field of the Invention

The present invention relates to an apparatus for moving an article stepwise in a predetermined direction as, for example, a scientific instrument having a linear adjustment mechanism.

2. Description of the Prior Art

Numerous mechanisms exist for the precise adjustment of movable portions of adjustable apparatus. Where such apparatus requires movement of a device along a predetermined path, means for providing large movements to the approximate desired position may also need means for stepwise adjustment to an exact position. Such an adjustment mechanism should preferably be capable of precise adjustment in either direction along the path.

The present invention provides such a device where the depression of a button engages a claw onto an adjacent stepped member. Further depression of the button forces the button, and positions of the device associated with it, laterally along the stepped member in small precise amounts. The device, however, does not preclude free movement of the device along the stepped member.

SUMMARY OF THE INVENTION

To achieve these and other objects of the invention, there is provided an apparatus for providing stepwise movement along an elongated, stepped member. The apparatus is comprised of a holder disposed to move along said stepped member. The holder has at least one opening through it which contains a button mounted in the opening. The button includes claw means that are pivotally affixed to the button. Depression of the button within said holder engages the claw with the stepped member and further depression of the button causes the claw to pivot and move the button and the holder laterally.

Preferably, the button is elongated in a direction substantially parallel to the stepped member and is pivotably mounted to the holder. It is also preferred that the button include two knob-hole projections, one on each of its opposite ends. Individual claws are mounted beneath each of the projections and are disposed to move the button and the holder in opposite directions depending upon which of the projections is depressed. Depression of the projection engages one of the claws with the stepped member.

Such an apparatus provides a precise means for moving a portion of a device in a predetermined direction without precluding large changes in positions prior to a final precise positioning. This and other objects and advantages of the invention will become apparent from the disclosure of the preferred embodiments or may be learned by practice of the invention.

BRIEF DESCRIPTION OF THE DRAWINGS

FIG. 1 is a plan view of the same.

FIG. 2 is a cross-section taken along the line A—A of FIG. 1.

FIG. 3 is a cross-section taken along the line B—B of FIG. 1.

FIG. 4 is an exploded perspective view of the major portion of this embodiment.

FIGS. 5 through 7 are views similar to FIG. 2 but show different positions of the elements of this embodiment.

DESCRIPTION OF THE PREFERRED EMBODIMENTS

The invention will now be disclosed by means of preferred embodiments.

Figure 1:
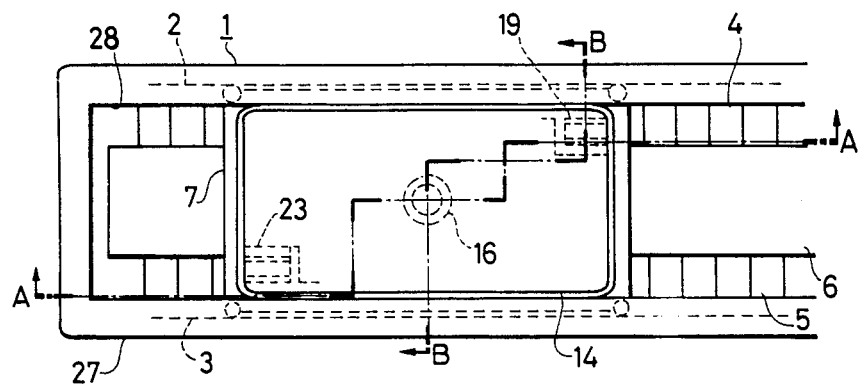
FIGS. 1 through 7 are representations of a first embodiment of the invention.
Figure 2:
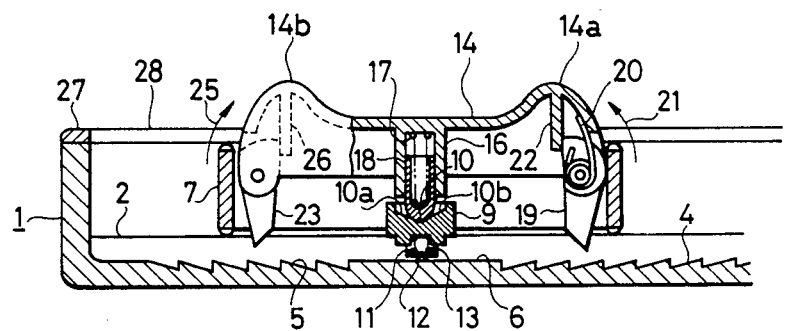
Figure 3:
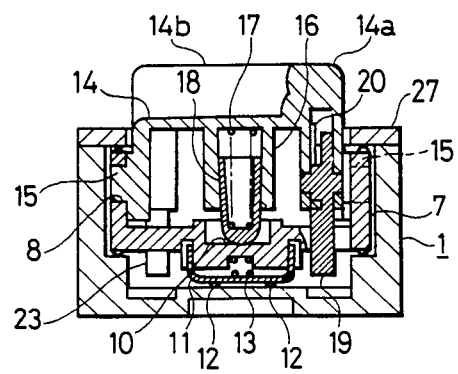

A first embodiment is depicted in FIGS. 1 through 7. In this embodiment an elongated frame 1, which is open along its top, is provided with lateral guides 2 and 3 extending on the front and rear sides of the base of the frame. As shown in FIG. 2, the base of the frame 1 has two separate elongated stepped members, ratchets 4 and 5 along the lateral guides 2 and 3. Ratchet 4 has a serrated form with teeth oriented diagonally and upwardly to the right, while ratchet 5 (also in a serrated form) has its teeth oriented diagonally and upwardly to the left.

Figure 4:
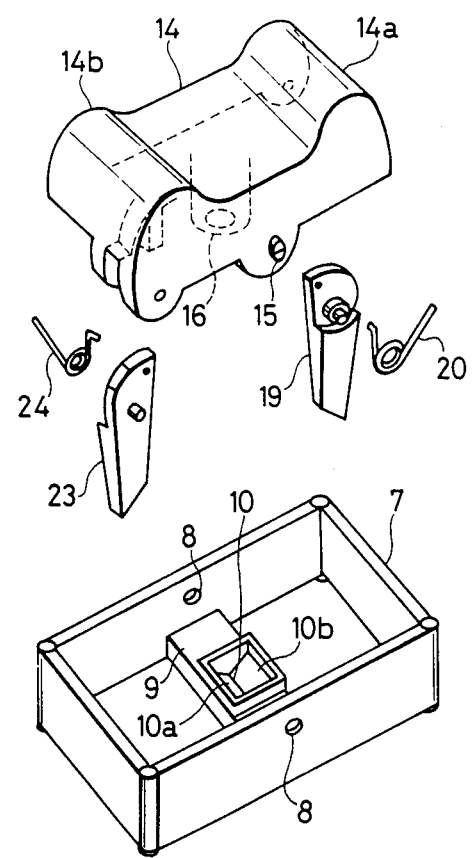

A fixed base contact 6 is disposed in the center of the base of frame 1 and extends longitudinally therein. As is depicted in FIG. 4, a rectangular holder 7 includes pivot holes 8 formed centrally in the opposite longer walls. A support 9 is centrally and integrally formed to extend between the opposite longer walls of holder 7. As is depicted in FIG. 4, support 9 includes a support recess 10 on its top. A contact strip 11 capable of up and down movement is disposed on the underside of support 9 and is formed on its underside with movable contacts 12. The contact strip 11 is downwardly biased by a compressive coil spring 13 interposed between the support 9 and the contact strip 11 so that the movable contacts 12 are brought in contact with the fixed contact 6 of the frame. The holder 7 as thus fabricated is accommodated in the frame 1 and is carried on the lateral guides 2 and 3 in a longitudinal direction.

A substantially rectangular and flat button 14 is disposed within the opening on the upper surface of holder 7. Button 14 includes control knobs 14a and 14b formed on opposite ends of the upper surface of button 14. The pivot pins 15 are outwardly projected from the center of the front and rear walls of the button. A sleeve 16 extends downwardly from the center of the upper wall of the button and includes projection 18 fitted in the sleeve 16 with a compressive coil spring 17 therebetween for up and down biased movement of the projection 18. The button 14 is arranged in the holder 7 in such a manner that the pivot pins 15 pass through the support holes 8, such that the projection 18 abuts against and bears on the support recess 10. The support recess 10 in the holder 7 is formed with inclined surfaces 10a and 10b. The projection 18 normally bears on the center of the bottom of the support recess 10 to hold the button 14 in the horizontal original position shown in FIGS. 2 and 7. The mismatch between the center of rotation of the button 14 and the contact between the projection 18 and the recess 10 provides a bias of the button 14 to a horizontal position.

As is depicted in FIGS. 2-7, a claw 19 is pivotally affixed adjacent the right end of botton 14 and engages the ratchet 4 from above. The claw 19 is given rotational force in the direction of an arrow 21 by means of a torsion coil spring 20. This rotational force is controlled by a control projection 22 extending downwardly from the upper wall of the button 14, thus retaining the claw 19 in the positions depicted in FIGS. 2 and 7.

Another claw 23 is pivoted to the left end of the button 14 above the ratchet 5 from above. The claw 23 is given rotational force in the direction of an arrow 25 by means of a torsion coil spring 24. This rotational force is controlled by another control projection 26 extending downwardly from the upper wall of the button 14. This will also return the claw 23 to the position depicted in FIGS. 2 and 7.

A cover 27 is mounted over the upper open end of the frame 1 and is provided with a guide opening 28 formed longitudinally on the frame 1 from which the upper position of the button 14 projects.

The method of operation of this embodiment will now be explained.

Figure 5:
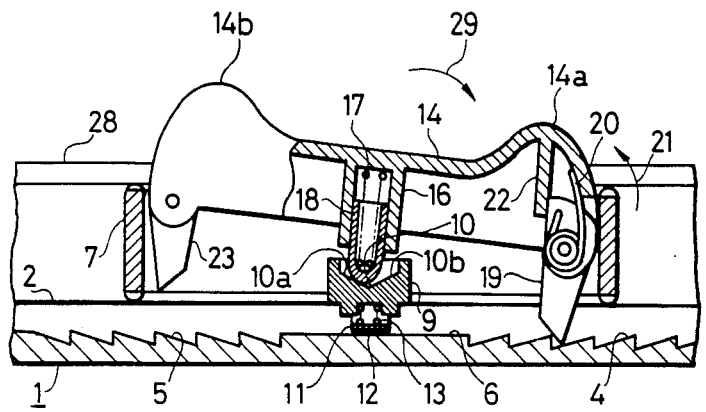
Figure 6:
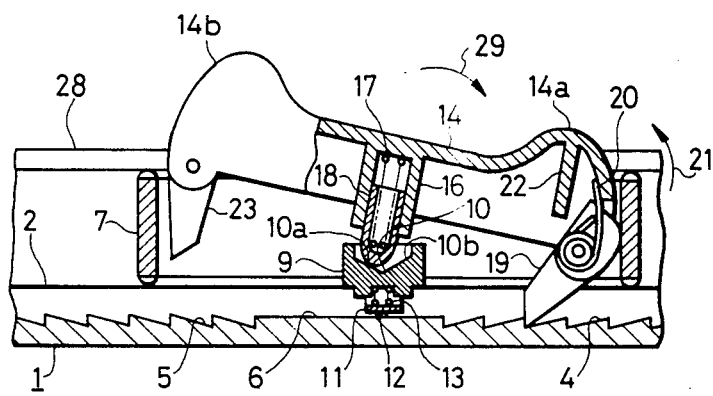
Figure 7:
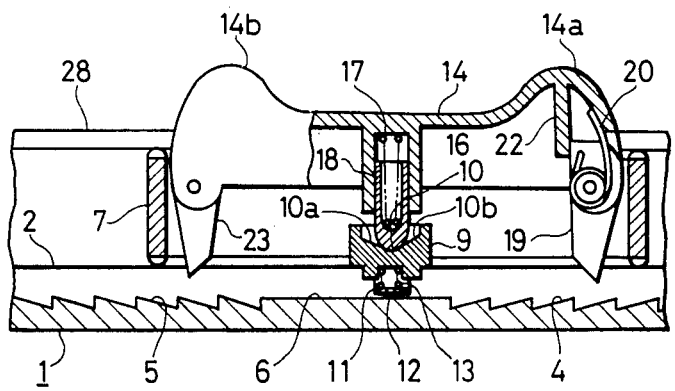

When knob 14a of the button 14 is depressed to rotate the button 14 in the direction of an arrow 29, the tip of the claw 19 engages the ratchet 4 as shown in FIG. 5. Further rotation of the button 14 in the direction of the arrow 29 by depression of control knob 14a moves the button 14 and the holder 7 to the right as depicted in FIG. 6. Thereafter, when the knob 14a is released, the projection element 18 slides along the inclined surface 10a of the recess 10 to fall into the center of the recess by the action of the compressive coil spring 17 and the inclined surface 10a. When this occurs, the button 14 rotates in a direction opposite to the direction of the arrow 29, and claw 19 is in turn rotated by the action of the torsion coil spring 20 in the direction of the arrow 21. This will return the button 14 and the claw 19 to the original position as shown in FIG. 7. Accordingly, the holder 7 in the position of FIG. 7 is in a position stepwise and rightward by one pitch of the ratchet 4 from the position of FIG. 2. In this manner, continuously depressing and releasing knob 14a disengages the claw 19 from successive pitches of ratchet 4, thereby stepwise moving the holder 7 rightward in frame 1.

On the other hand, when control knob 14b of the button 14 is depressed to rotate the button 14 in a direction opposite to the direction of the arrow 29, the tip of the claw 23 engages the ratchet 5 to stepwise move the holder 7 leftward because the ratchet 5 is inclined in the reverse direction as that of the ratchet 4.

It should be noted that button 14 may be moved to the right if 14a is depressed or to the left if 14b is depressed by the user without disengaging the claws 19 or 23 in the ratchets 4 or 5. In this manner, the instant apparatus may be used in the same manner as a conventional sliding switch Furthermore, the claws 19 and 23 are adapted to be out of contact with the ratchets 4 and 5 and kept upwardly away therefrom when the button 14 is in the horizontal position of FIGS. 2 and 7 so that the holder 7 may slide to the right or left by the button 14 with the knob 14a or 14b not depressed. For this reason, the holder 7 may be readily moved to any position above frame 1 away from the original position.

This first embodiment has, however, a disadvantage that the holder 7 can be made to move laterally in the direction being induced by the claw 19 by subjecting the knob 14a to a lateral force to the right. Similarly, the device can be made to overrun to the left if 14b is depressed and the holder 7 is further moved to the left by a lateral force. The second embodiment of FIGS. 8 through 10 does not have such a disadvantage.

Figure 8:
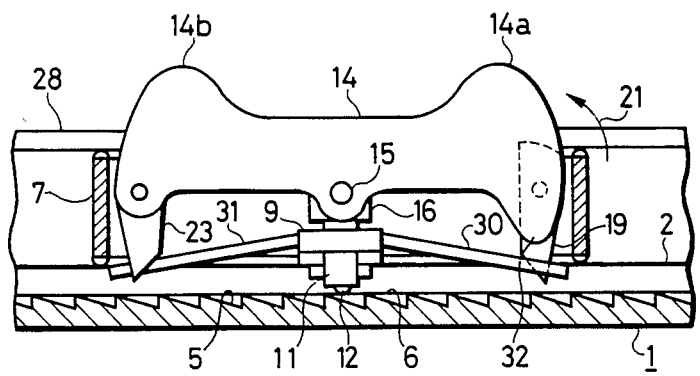
FIGS. 8 through 10 are views similar to FIG. 2 but show different positions of the elements of a second embodiment of the invention.
Figure 9:
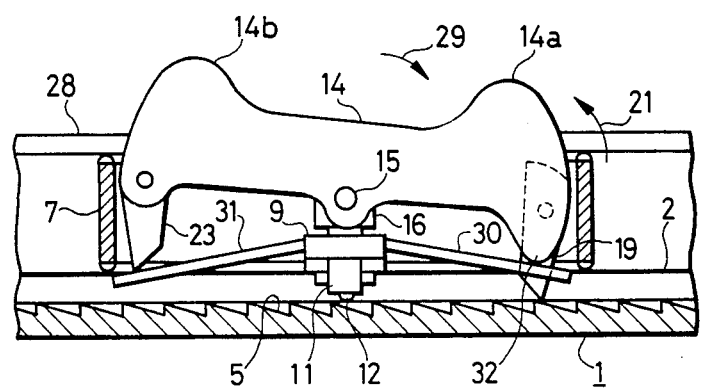
Figure 10:
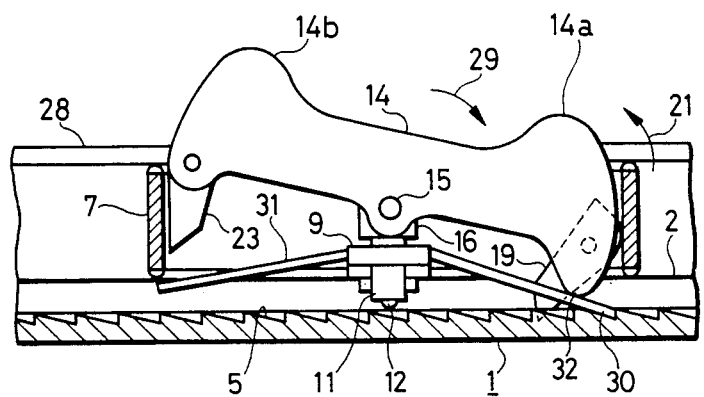

In the embodiment of FIGS. 8 through 10, the device is generally configured as the first embodiment of FIGS. 1 through 7 like numerals are used to designate like or corresponding parts of the first embodiment. As in the first embodiment, a claw 19 engages a ratchet 4 to induce movement of the device to the right. Claw 23 engages a ratchet 5 oriented in the reverse direction as ratchet 4 and disposed to move the device to the left. The following description is limited to only parts different from those in the first embodiment to avoid repetition.

This second embodiment includes limit members 30 and 31, whose resilient base ends are fixed to the support 9 of the holder 7 and whose tip ends are disposed in opposition to the ratchets 4 (see FIG. 2) and 5 from above. The button 14 includes at its opposite ends projection 32 to correspond to the tip ends of the members 30 and 31 from above, respectively.

Knob 14a is depressed to move the button 14 in the direction of the arrow 29, thereby engaging the claw 19 with the ratchet 4 to stepwise move the holder 7 to the right. However, the holder 7 is prevented from further moving rightward (see FIG. 10) by engagement of the tip end of the limit member 30 with the ratchet 5 since the projection 32 has depressed the tip end of the member 30 into engagement with the ratchet 5. This is also the case where knob 14b is depressed to move the button 14 in a direction opposite to the direction of the arrow 29. More specifically, the holder 7 is prevented from further moving leftward by engagement of the tip end of the member 31 with the ratchet 4 when the holder 7 is moved to the left by one pitch of the ratchet 5.

The second embodiment has the advantage that the holder 7 is positively stepwise moved right or left by one pitch of the ratchet 4 or 5 but is prevented from moving a distance exceeding one pitch.

Figure 11:
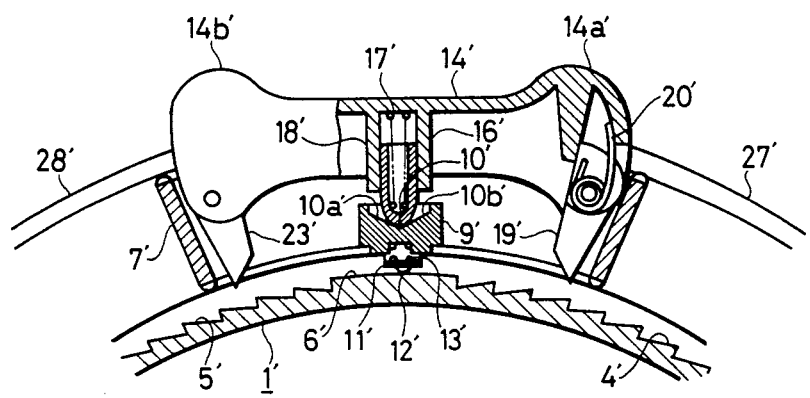
FIG. 11 is a view similar to FIG. 2 but shows a third embodiment of the invention.

FIG. 11 is a view of a third embodiment of the invention, which is identical with the first embodiment except that the frame 1, holder 7 and the cover 37, etc. are in a circular or semi-circular form. In the embodiment of FIG. 11, prime numerals are used to denote corresponding or like parts of the first embodiment.

The third embodiment has the advantage that the holder 7' may be stepwise moved along the circumference defined by the housing 1' where there is no planar space for mounting such a device. In addition, in this embodiment if the structure as a whole is in a circular form, the holder 7' may be stepwise moved completely around such a structure in either direction, i.e. to the left or to the right.

Figure 12:
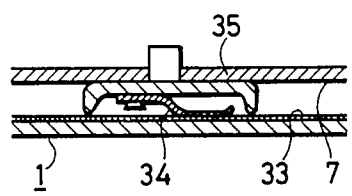
FIGS. 12 and 13 are cross-sections of two different contact portions of an embodiment of the invention.

FIG. 12 is a view showing a portion of an embodiment of the invention where it is applied to a variable resistor. This would be substantially identical with the first embodiment except that the frame 1 would include a resistor band 33 in place of the contact 11, and that the holder 7 would be provided with a support member 35 instead of the contact strip 11 to support a movable element 34 of a leaf spring slidably in contact with the resistor band 33.

Figure 13:
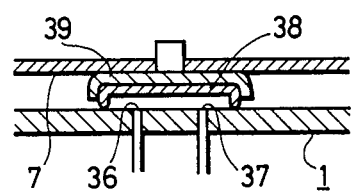

FIG. 13 is a view showing a portion of an embodiment of the invention where it is applied to a vacuum selector device. It is similar to the first embodiment except that the frame 1 is formed with a plurality of channels 36 (only one is shown) in communication with the vacuum source (not shown) such as a pump or the like and a plurality of another channels 37 (only one is shown) in communication with control means. The fixed contact 6 would be eliminated and the holder 7 would include a support member 39, in place of the contact strip 11, to support a valve body 38.

In this configuration, the channels 36 and 37 are in flow communication through the valve body 38 as the holder 7 is incrementally moved to actuate the control means by the vacuum. The channels 36 and 37 are made incommunicable by the valve body 38 to restore the control means.

FIGS. 14 through 20 show a fourth embodiment in which the invention is applied to a sliding switch, wherein like numerals are used to designate like or corresponding parts of the first embodiment. The following description is limited to only parts different from those in the first embodiment.

Figure 14:
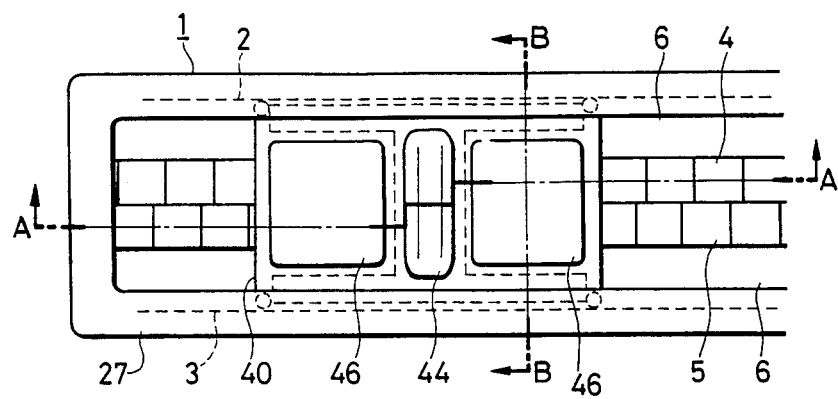
FIGS. 14 through 20 are views similar to those of FIGS. 1 through 7 but show a fourth embodiment of the invention.
Figure 15:
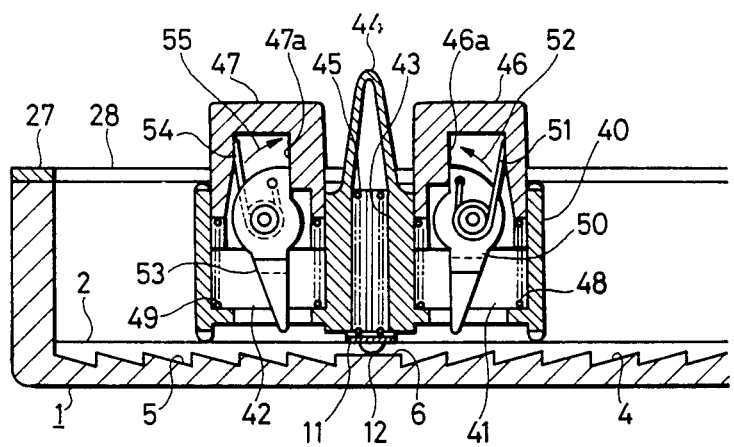
Figure 16:
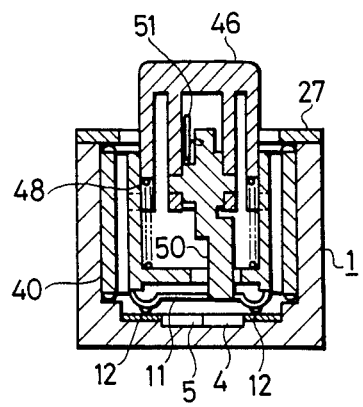
Figure 17:
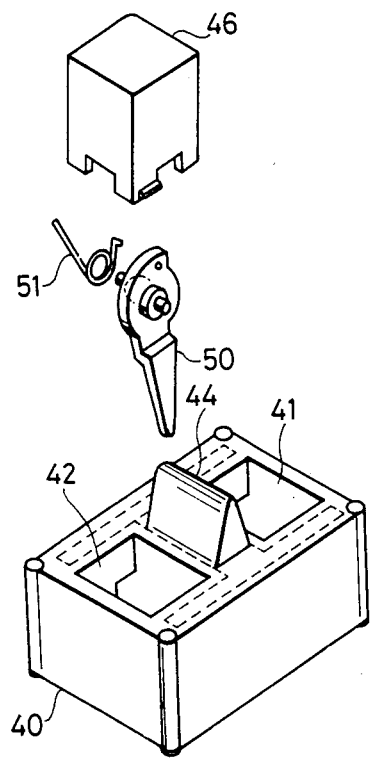

Referring to FIGS. 14, 15 and 16, the ratchets 4 and 5 are formed adjacent each other in the center of the frame 1 which includes the fixed contacts 6 disposed outside the central ratchets 4 and 5. The holder 40 is formed with rectangular openings 41 and 42. Its center includes a spring receptacle 43 above which an upwardly extending tension spring 44 is formed. A compressive coil spring 45 is interposed between the inner surface of the spring receptacle 43 and the contact strip 11 resiliently connecting the movable contacts 12 of the contact strip 11 with the fixed contacts 6. Buttons 46 and 47 are placed in the openings 41 and 42. These buttons are vertically movable but are prevented from slipping out by means applied to the mount openings 41 and 42 in the holder 40. Compressive coil springs 48 and 49 are incorporated between the knobs 46 and 47 and the base wall of the holder 40 to urge the buttons 46 and 47 upwardly out of the guide opening 28 in the cover 27. A claw 50 is pivoted to the button 46 facing the ratchet 4 from above and is given a rotational force in the direction of an arrow 52 by a torsion coil spring 51. The rotational force is limited by a wall 46a formed in the button 46 to hold the claw 50 in the position of FIG. 15. A claw 53 is pivoted to the button 47 facing the ratchet 5 from above and is given a rotational force in the direction of an arrow 55 by a torsion coil spring 54. The rotational force is limited by a wall 47a formed in the button 47 to hold the claw 53 in the position of FIG. 15. The fixed contact 6 is shown in FIG. 15 in the center for the convenience of illustration and may be located elsewhere.

Figure 18:
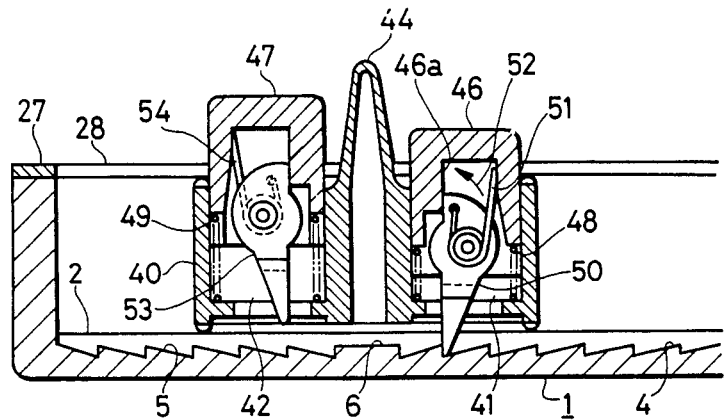
Figure 19:
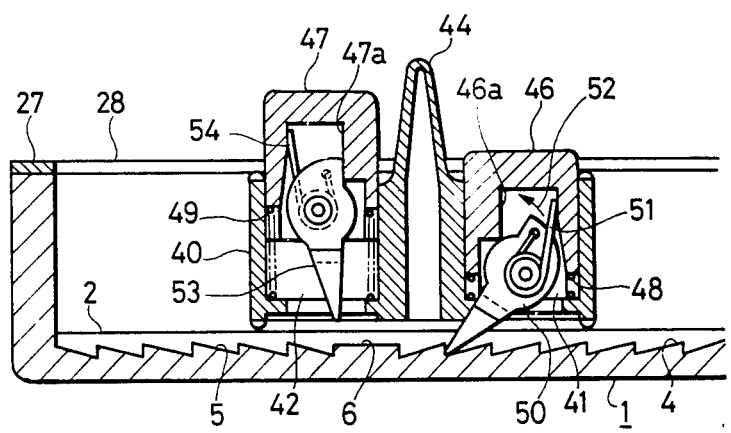
Figure 20:
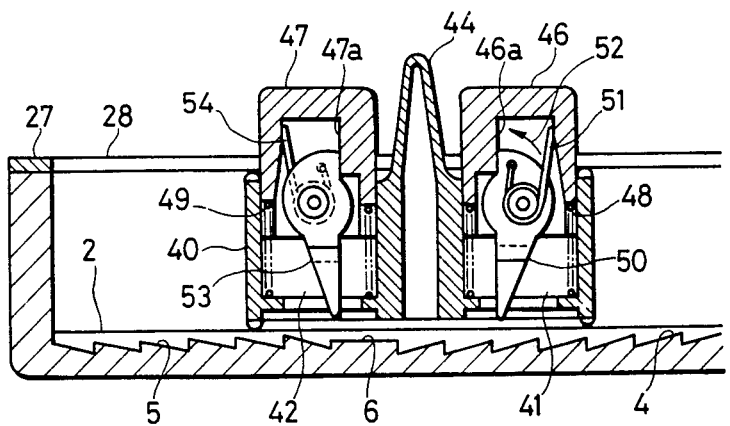

The operation of the fourth embodiment is substantially similar to that of the first embodiment. For instance, when the button 46 is depressed as shown in FIG. 18, this lowers the claw 50 as well as the button 46 to cause the tip end of the claw to abut against the ratchet. Then, the button 46 is further depressed to rotate the claw 50 against the ratchet 4, thereby stepwise moving the holder 40 as depicted in FIG. 19. Thereafter, when button 46 is released, the button 46 and the claw 50 return to the position depicted in FIG. 20. Similarly, when the other button 47 is depressed, the holder 40 is incrementally moved to the left in the same manner as aforementioned.

Accordingly, the same results and advantages as those of the previous embodiments may be derived from the fourth embodiment. In addition, the buttons 46 and 47 are independently operated which may be an advantage for certain devices.

Figure 21:
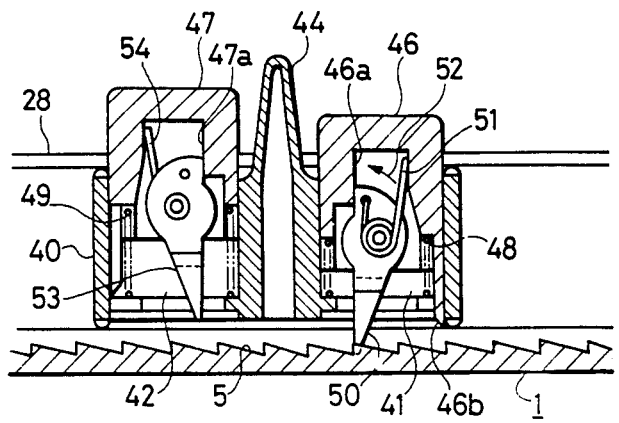
FIGS. 21 and 22 are views similar to FIG. 15 but shows different positions of the elements of a fifth embodiment of the invention.
Figure 22:
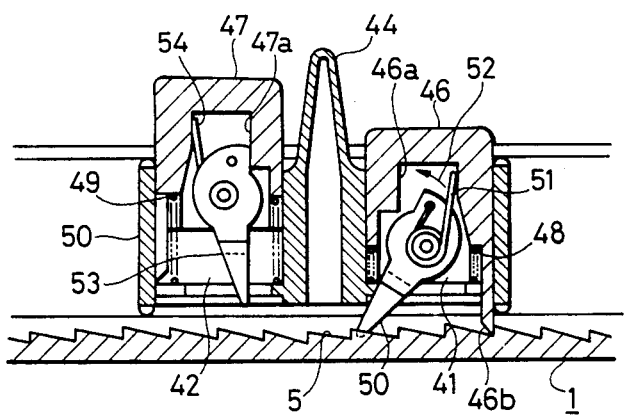

FIGS. 21 and 22 show a fifth embodiment of the invention wherein like numerals are used to indicate like or corresponding parts in the fourth embodiment. Those different from the parts in the previous embodiment will be explained.

The buttons 46 and 47 are provided with limit members 46b and 47b to engage the ratchets 5 and 4 (FIG. 15) from above.

The button 46 is depressed to stepwise move the holder 40 to the right and to engage the limit member 46b with the ratchet 5 when the holder 40 is incrementally moved by one pitch of the ratchet 4. On the other hand, the button 47 is depressed to stepwise move the holder 40 to the left by one pitch of the ratchet 5 so that the stopper 47b engage the ratchet 4.

Therefore, the same result and advantage as those of the second embodiment may be derived from the fifth embodiment, namely that with either button 46 or 47 fully depressed the housing cannot be moved to the right or left.

Figure 23:
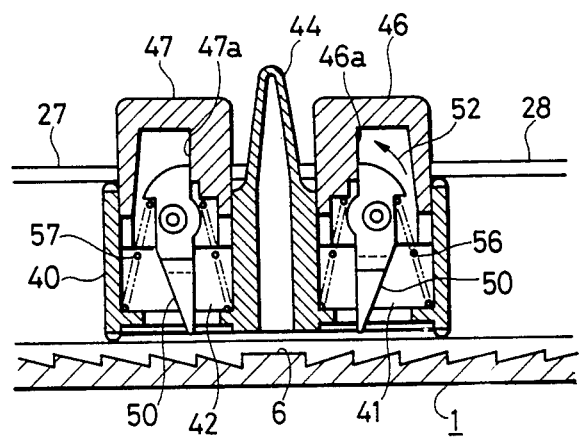
FIGS. 23 and 24 are views similar to FIG. 15 but shows the sixth and seventh embodiments of the invention.

FIG. 23 shows a sixth embodiment of the invention, which is similar to the fourth embodiment except that substantially conical compressive coil springs 56 and 57 are used in place of the compressive coil springs 48 and 49. In addition, torsion coil springs 51 and 54 are disposed between the button 46, the claw 50 and the base wall of the holder 40 and between the button 47, the claw 53 and the base wall of the holder 40. This reduces the number of the springs.

Figure 24:
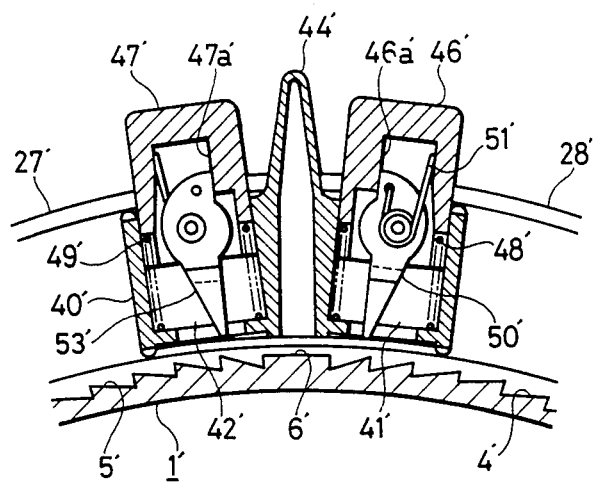

FIG. 24 shows a seventh embodiment of the invention which is identical with the fourth embodiment except that the frame 1, holder 40, and the cover 27, etc., are in a arcuate, semi-circular or a circular form. Like prime numerals are employed to designate parts like or corresponding to parts in the fourth embodiment.

As set forth above, the apparatus of the present invention has the advantage that the holder may be moved along the frame in any amount but can also be moved stepwise by depression of a knob or button and moved a single incremental amount. In several embodiments the holder can be locked in position after the incremental stepwise movement.

The invention is not limited to the embodiments as described and illustrated in the accompanying drawings and may be modified without departing from the spirit and scope of the invention. The scope of the invention is to be determined by the appended claims and their equivalents.

What is claimed is:

1. An apparatus for providing stepwise movement of a holder along an elongated, stepped member, said apparatus comprising:
    an elongated stepped member;
    a holder disposed to move along said stepped member, said holder having at least one opening therethrough, with said opening being substantially normal to a surface of said stepped member along which said holder moves; and at least one button mounted in said opening, said button including at least one claw pivotally affixed to said button, wherein depression of said button within said holder engages said claw in said stepped member such that further depression of said button causes said claw to pivot and move said button and said holder laterally stepwise along said stepped member and means for biasing said at least one button to a central position where each claw is out of engagement with said stepped member.

2. The apparatus of claim 1 wherein said button is elongated in a direction parallel to the stepped member and is pivotally mounted to said holder, said button further including two knob-like projections, one on each opposite end of said button, and two claws one pivotally affixed beneath each said projection wherein depression of one said projection engages said claw therebeneath with said stepped member to move said button and said holder in opposite directions depending upon which of said projections is depressed.

3. The apparatus of claim 1 wherein said apparatus further includes stop means for selectively preventing lateral movement of said holder.

4. the apparatus of claim 3 wherein said stop means comprise at least one stop member disposed to engage said step member when said button is moved vertically, said stop member preventing lateral movement of said holder in one direction.

5. The apparatus of claim 4 wherein said stop member is a projection from said button.

6. The apparatus of claim 4 wherein said stop member is an elongated member pressed into engagement with said stepped member by depression of said button.

7. The apparatus of claim 1 wherein said holder contains two openings, each of said openings containing a vertically movable button, each of said buttons being disposed to move said holder in opposite directions along said stepped member.

8. The apparatus of claim 7 wherein said apparatus includes bias means to retract said buttons from said stepped member such that said claw means does not engage said stepped member except upon depression of said buttons in opposition to said bias means.

9. An apparatus for providing stepwise movement along an elongated, stepped member, said apparatus comprising:

a holder disposed to move along said stepped member, said holder having at least one opening therethrough;

at least one button mounted in said opening, said button including at least one claw pivotally affixed to said button, wherein depression of said button within said holder engages said claw in said stepped member such that further depression of said button causes said claw to pivot and move said button and said holder laterally along said stepped member; and means for biasing said at least one button to a central position where each claw is out of engagement with said stepped member, said biasing means having a support means affixed to said holder, said support means including an upwardly oriented recess, said button including a spring-biased projection disposed to contact said recess, said button having a center of pivot spacially separated from the surface of said recess such that pivoting of said button results in resistance from said spring-biased projection.

10. The apparatus of claim 9 wherein said recess includes inclined surfaces disposed to engage said projection and impart a bias toward said central position.

* * * * *

UNITED STATES PATENT AND TRADEMARK OFFICE
CERTIFICATE OF CORRECTION

PATENT NO. : 4,679,453

DATED : July 14, 1987

INVENTOR(S) : Masayuki Morita et al.

It is certified that error appears in the above-identified patent and that said Letters Patent is hereby corrected as shown below:

Correct title from "Apparatus for Producing Stepwise Movement" to --Apparatus for Providing Stepwise Movement--.

Signed and Sealed this

Fifteenth Day of September, 1987

*Attest:*

DONALD J. QUIGG

*Attesting Officer*  *Commissioner of Patents and Trademarks*